United States Patent
Yoo

(10) Patent No.: US 11,562,204 B2
(45) Date of Patent: Jan. 24, 2023

(54) METHOD AND APPARATUS FOR PERFORMING RECOGNITION USING RECURRENT MODEL AND TRAINING RECURRENT MODEL

(71) Applicant: Samsung Electronics Co., Ltd., Suwon-si (KR)

(72) Inventor: Sang Hyun Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1460 days.

(21) Appl. No.: 15/634,149

(22) Filed: Jun. 27, 2017

(65) Prior Publication Data

US 2018/0165572 A1 Jun. 14, 2018

(30) Foreign Application Priority Data

Dec. 14, 2016 (KR) .................. 10-2016-0170198

(51) Int. Cl.
 *G06N 3/04* (2006.01)
 *G06N 3/08* (2006.01)
 *G10L 15/16* (2006.01)

(52) U.S. Cl.
 CPC ............ *G06N 3/0445* (2013.01); *G06N 3/08* (2013.01); *G10L 15/16* (2013.01); *G06N 3/0454* (2013.01); *G06N 3/084* (2013.01)

(58) Field of Classification Search
 None
 See application file for complete search history.

(56) References Cited

U.S. PATENT DOCUMENTS

| 6,041,299 A | 3/2000 | Schuster et al. |
| 8,463,721 B2 | 6/2013 | Prokhorov |
| 9,263,036 B1 | 2/2016 | Graves |
| 9,378,733 B1 | 6/2016 | Vanhoucke et al. |
| 2007/0288407 A1 | 12/2007 | Nishimoto et al. |
| 2015/0170640 A1 | 6/2015 | Sak et al. |
| 2016/0026913 A1 | 1/2016 | Moon et al. |
| 2016/0110343 A1 | 4/2016 | Kumar Rangarajan Sridhar |
| 2016/0155436 A1 | 6/2016 | Choi et al. |
| 2016/0171974 A1 | 6/2016 | Hannun et al. |
| 2017/0357716 A1* | 12/2017 | Bellegarda ................ G06F 3/16 |

FOREIGN PATENT DOCUMENTS

| JP | 2014-013555 A | 1/2014 |
| KR | 10-2016-0089210 A | 7/2016 |

OTHER PUBLICATIONS

Hakkani-Tür, Dilek, et al. "Multi-domain joint semantic frame parsing using bi-directional rnn-lstm." Interspeech. 2016. (Year: 2016).*

(Continued)

*Primary Examiner* — Hal Schnee
(74) *Attorney, Agent, or Firm* — NSIP Law

(57) ABSTRACT

A recognition method includes extracting target data corresponding to a current window and padding data subsequent to the target data from sequence data; acquiring a state parameter corresponding to a previous window; and calculating a recognition result for the current window based on the state parameter, the extracted target data, and the extracted padding data using a recurrent model.

29 Claims, 12 Drawing Sheets

(56) References Cited

OTHER PUBLICATIONS

Graves, Alex, et al., "Hybrid Speech Recognition with Deep Bidirectional LSTM", *2013 IEEE Workshop on Automatic Speech Recognition and Understanding*, 2013 (6 pages in English).

Mesnil, Grégoire, et al. "Using Recurrent Neural Networks for Slot Filling in Spoken Language Understanding." *IEEE/ACM Transactions on Audio, Speech, and Language Processing*, vol. 23, Issue 3, Mar. 2015 (pp. 530-539).

Chen, Kai et al., "Training Deep Bidirectional LSTM Acoustic Model for LVCSR by a Context-Sensitive-Chunk BPTT Approach", *IEEE/ACM Transactions on Audio, Speech, and Language Processing*, vol. 24, Issue 7, Jul. 2016 (pp. 1185-1193).

Bjerva, Johannes, et al. "Semantic Tagging with Deep Residual Networks." *arXiv preprint arXiv:1609.07053*, 2016. (11 pages in English).

Heymann, Jahn et al., "Wide Residual BLSTM Network with Discriminative Speaker Adaptation for Robust Speech Recognition." *CHiME 2016 Workshop*. 2016 (6 pages in English).

Extended European Search Report dated Mar. 6, 2018 in corresponding European Patent Application No. 17190423.8 (12 pages in English).

\* cited by examiner

METHOD AND APPARATUS FOR PERFORMING RECOGNITION USING RECURRENT MODEL AND TRAINING RECURRENT MODEL

CROSS-REFERENCE TO RELATED APPLICATIONS

This application claims the benefit under 35 USC 119(a) of Korean Patent Application No. 10-2016-0170198 filed on Dec. 14, 2016, in the Korean Intellectual Property Office, the entire disclosure of which is incorporated herein by reference for all purposes.

BACKGROUND

1. Field

The following description relates to technology for performing a recognition based on a recurrent model and technology for training a recurrent model.

2. Description of Related Art

Recently, to classify a human input pattern, active research on applications of an efficient pattern recognition method of a human to an actual computer has been conducted. One such area of research is focused on an artificial neural network that models characteristics of biological nerve cells of a human through mathematical expressions. To classify the input pattern, the artificial neural network employs an algorithm that simulates a learning capability of a human. Using this algorithm, the artificial neural network generates a mapping between the input pattern and output patterns. The capability of generating such a mapping is referred to as a learning capability of the artificial neural network. Based on the learning result, the artificial neural network generates an output with respect to an input pattern that has not yet been used for learning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a recognition method includes extracting target data corresponding to a current window and padding data subsequent to the target data from sequence data; acquiring a state parameter corresponding to a previous window; and calculating a recognition result for the current window based on the state parameter, the extracted target data, and the extracted padding data using a recurrent model.

The recognition method may further include temporarily storing a state parameter corresponding to a last frame of the current window for use in a subsequent window.

The recognition method may further include excluding a state parameter associated with a padding and output data of the padding data calculated based on the recurrent model.

The calculating of the recognition result may include unfolding the recurrent model by a window length and a padding length of the current window; and inputting the state parameter, the extracted target data, and the extracted padding data to the unfolded recurrent model for each frame and calculating output data corresponding to frames included in the current window.

The calculating of the recognition result may include updating an input value of a node corresponding to a first frame of the current window based on a state parameter corresponding to a last frame of the previous window.

The extracting of the target data and the padding data may include extracting data corresponding to a window length, starting from frame data subsequent to last frame data of the previous window, from the sequence data as the target data corresponding to the current window.

The extracting of the target data and the padding data may include extracting data corresponding to a padding length, starting from frame data subsequent to last frame data of the current window, from the sequence data as the padding data corresponding to a padding.

The recurrent model may be a bidirectional recurrent neural network that is trained to output a training output in response to a training input based on training data.

The recurrent model may include a node corresponding to each frame included in a window and a padding; and the calculating of the recognition result may include updating a state parameter based on a forward pass of the node sequentially from a first frame to a last frame of the window; updating a state parameter based on a backward pass of the node sequentially from the last frame to the first frame of the window; and providing the state parameter based on the forward pass and the state parameter based on the backward pass to a node of a subsequent layer.

The sequence data may correspond to a voice signal; and the calculating of the recognition result may include identifying a pronunciation from the target data corresponding to the current window.

The acquiring of the state parameter corresponding to the previous window may include determining the state parameter corresponding to the previous window to be a default value in response to the current window being a first window with respect to the sequence data.

The extracting of the target data and the padding data may include excluding the padding data in response to the current window being a last window with respect to the sequence data.

In another general aspect, a non-transitory computer-readable medium stores instructions that, when executed by a processor, cause the processor to perform the recognition method described above.

In another general aspect, a recognition apparatus includes a storage configured to store a recurrent model; and a processor configured to extract target data corresponding to a current window and padding data subsequent to the target data from sequence data, acquire a state parameter corresponding to a previous window, and calculate a recognition result for the current window based on the state parameter, the extracted target data, and the extracted padding data using the recurrent model.

In another general aspect, a training method includes acquiring a recurrent model; extracting target data corresponding to a current window and padding data subsequent to the target data from a training input; acquiring a state parameter corresponding to a previous window; and training the recurrent model so that a training output mapped to the training input is calculated based on the state parameter, the extracted target data, and the extracted padding data.

The training method may further include temporarily storing a state parameter corresponding to a last frame of the current window for use in a training based on training data of a subsequent window in response to data corresponding to the subsequent window being present in the training input.

The training method may further include excluding output data associated with a padding calculated based on a state parameter associated with the padding using the recurrent model.

The training may include updating a state parameter of a node corresponding to a first frame of the current window based on a state parameter corresponding to a last frame of the previous window.

The acquiring of the state parameter corresponding to the previous window may include determining the state parameter corresponding to the previous window to be a default value in response to the current window being a first window with respect to the training input.

The extracting of the target data and the padding data may include excluding the padding data in response to the current window being a last window with respect to the training input.

In another general aspect, a recognition method includes extracting target data corresponding to a current window from sequence data; acquiring past context data corresponding to data preceding the current window in the sequence data; acquiring future context data corresponding to data following the current window in the sequence data, the past context data and the future context data being different types of data; and calculating a recognition result for the current window based on the past context data, the extracted target data, and the future context data using a recurrent model.

The acquiring of the past context data may include acquiring, as the past context data, a state parameter corresponding to a previous window preceding the current window in the sequence data; and the acquiring of the future context data may include extracting, as the future context data, padding data following the extracted target data from the sequence data.

The acquiring of the state parameter may include setting the state parameter to a default value in response to the current window being a first window of the sequence data; and acquiring, as the state parameter, a state parameter obtained during recognition performed on the previous window in response to the current window not being the first window of the sequence data.

The state parameter obtained during the recognition performed on the previous window may be stored during the recognition performed on the previous window; and the acquiring of the state parameter obtained during the recognition performed on the previous window may include retrieving the stored state parameter.

The previous window and the current window each include a plurality of frames; and the acquiring of the state parameter may include acquiring a state parameter corresponding to a final frame of the previous window.

In another general aspect, a training method includes acquiring a recurrent model; extracting target data corresponding to a current window from a training input; acquiring past context data corresponding to data preceding the current window in the training input; acquiring future context data corresponding to data following the current window in the training input, the past context data and the future context data being different types of data; and training the recurrent model so that a training output mapped to the training input is calculated based on the past context data, the extracted target data, and the future context data.

The acquiring of the past context data may include acquiring, as the past context data, a state parameter corresponding to a previous window preceding the current window in the training input; and the acquiring of the future context data may include extracting, as the future context data, padding data following the extracted target data from the training input.

The acquiring of the state parameter may include setting the state parameter to a default value in response to the current window being a first window of the training input; and acquiring, as the state parameter, a state parameter obtained during training performed on the previous window in response to the current window not being the first window of the training input.

The state parameter obtained during the training performed on the previous window may be stored during the training performed on the previous window; and the acquiring of the state parameter obtained during the training performed on the previous window may include retrieving the stored state parameter.

The previous window and the current window each include a plurality of frames; and the acquiring of the state parameter may include acquiring a state parameter corresponding to a final frame of the previous window.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" include the plural forms as well, unless the context clearly indicates otherwise. As used herein, the terms "include, "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 1:
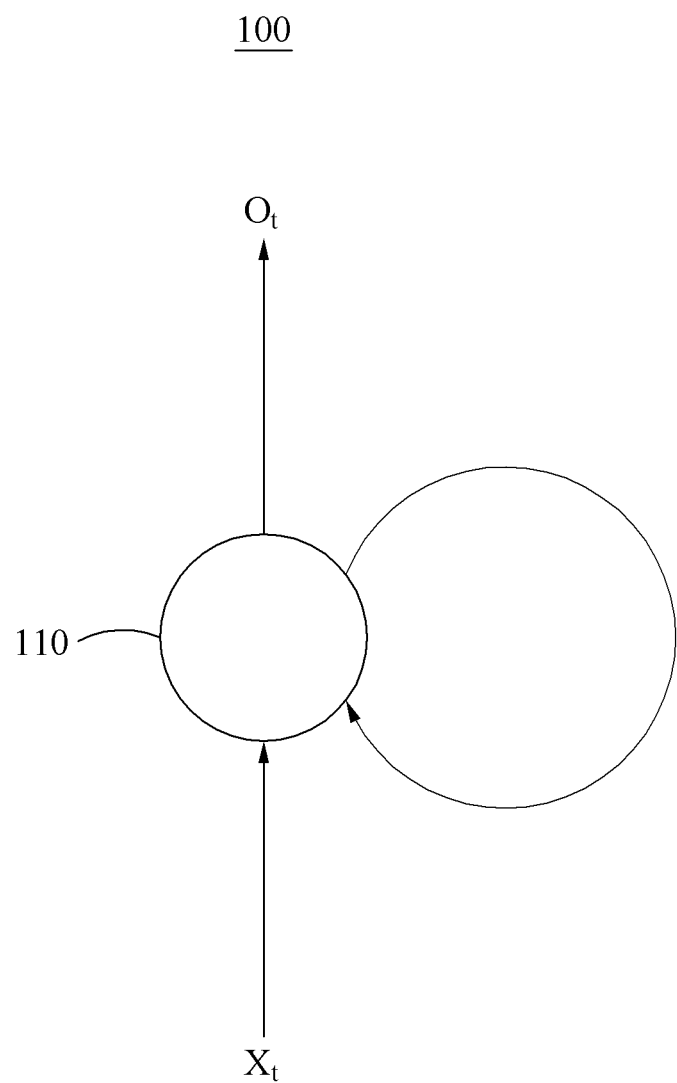
FIG. 1 illustrates an example of a recurrent neural network.

FIG. 1 illustrates an example of a recurrent neural network.

A neural network is a recognition model implemented in hardware imitating a computational ability of a biological system using a large number of artificial neurons connected together by connection lines. In this application, a recurrent neural network (RNN) 100 is described as an example of the neural network.

The RNN 100 is a neural network including a loop. The RNN 100 is a neural network trained to output a new output $o_t$ from an input $x_t$ by recurrently inputting an output to the neural network. The RNN 100 includes a node 110 and an output of the node 110, for example, a hidden node, is recurrently input to the RNN 100. Although FIG. 1 illustrates that the RNN 100 includes the node 110 for brevity, this is merely one example, and other examples are possible. The node 110 is, for example, a unit configuring a hidden node included in the RNN 100. The node 110 included in the hidden layer is also be referred to as a hidden node.

In this application, a parameter indicating a value associated with the node is referred to as a state parameter. The state parameter includes, for example, an output value of the node 110. The state parameter may also be referred to for example, as a node parameter.

The RNN 100 may be, for example, a long short-term memory (LSTM) neural network. The node 110 in the hidden layer of the LSTM neural network includes one or more memory cells and a plurality of gates, for example, an input gate, a forget gate, and an output gate. In the LSTM neural network, the state parameter of the node 110 includes, for example, cell state values and output values of the node 110. The cell state values and the output values of the node 110 are controlled by the gates of the node 110. The LSTM neural network is merely one example, and a configuration of the RNN 100 is not limited to this example.

An input $x_t$ is frame data input to the RNN 100 at a point in time t. An output $o_t$ is frame data output from the RNN 100 at the point in time t. Hereinafter, the point in time t is also referred to as a time t and a timestamp t. Frame data is data obtained by sampling sequence data based on a predetermined length, for example, in frame units. A frame unit may vary based on a design of the RNN 100. The sequence data and the frame data will also be described with reference to FIG. 5.

Figure 2:
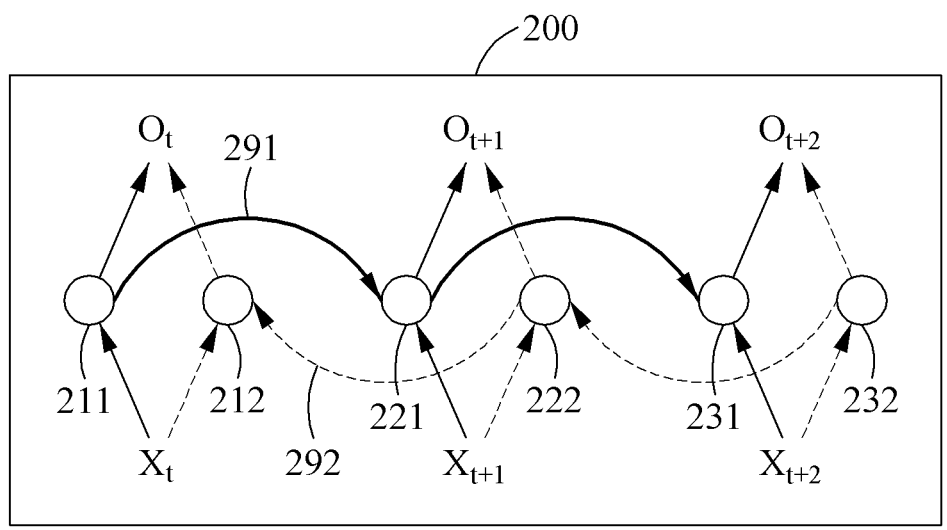
FIG. 2 illustrates an example of a recurrent neural network unfolded by a window length.

FIG. 2 illustrates an example of a recurrent neural network unfolded by a window length.

Referring to FIG. 2, an RNN is represented in a form that a recurrent connection is unfolded by a window length. Nodes of the RNN are classified into forward nodes 211, 221, and 231 and backward nodes 212, 222, and 232. Each of the forward nodes 211, 221, and 231 corresponds to a single frame, and each of the backward nodes 212, 222, and 232 corresponds to a single frame. In FIG. 2, each frame corresponds to a single forward node and a single backward node. A t-th frame corresponds to the forward node 211 and the backward node 212. However, this is merely one example. In other examples, a single frame may correspond to a plurality of forward nodes and a plurality of backward nodes.

The forward nodes 211, 221, and 231 are connected to one another through a recurrent connection that forms a forward pass 291. The backward nodes 212, 222, and 232 are connected to one another through a recurrent connection that forms a backward pass 292. The forward pass 291 is, for example, a connection through which a state parameter of a forward node of one frame is transferred to a forward node of a subsequent frame so that the forward node of the subsequent frame is updated based on a numerical expression and the transferred state parameter of the forward node of the one frame. The backward pass 292 is, for example, a connection through which a state parameter of a backward node of one frame is transferred to a backward node of a previous frame so that the backward node of the previous frame is updated based on a numerical expression and the transferred state parameter of the backward node of the one frame. An update path of the forward node may be independent of an update path of the backward node.

In the example in FIG. 2, a length of a window 200 is three frames, but a window may have other lengths. A recognition apparatus inputs input frame data, for example, an input $x_t$ at the time t to the forward node 211 and the backward node 212 corresponding to a frame at the time t. The recognition apparatus propagates a state parameter at the time t from the forward node 211 of the frame corresponding to the time t to the forward node 221 of a frame corresponding to a point in time t+1 based on the forward pass 291. Hereinafter, the point in time t+1 is also referred to as a time t+1. Also, the recognition apparatus propagates a state parameter at the time t+1 from the backward node 222 of the frame corresponding to the time t+1 to the backward node 212 of the frame corresponding to the time t based on the backward pass 292. The recognition apparatus calculates an output $o_t$ corresponding to a t-th frame from the input $x_t$ using the state parameter of the forward node 211, and the state parameter of the backward node 212 updated based on the backward pass 292.

Although FIG. 2 illustrates that a window length is three frames and only nodes are included in an RNN for brevity, this is merely one example, and other examples are possible.

Figure 3:
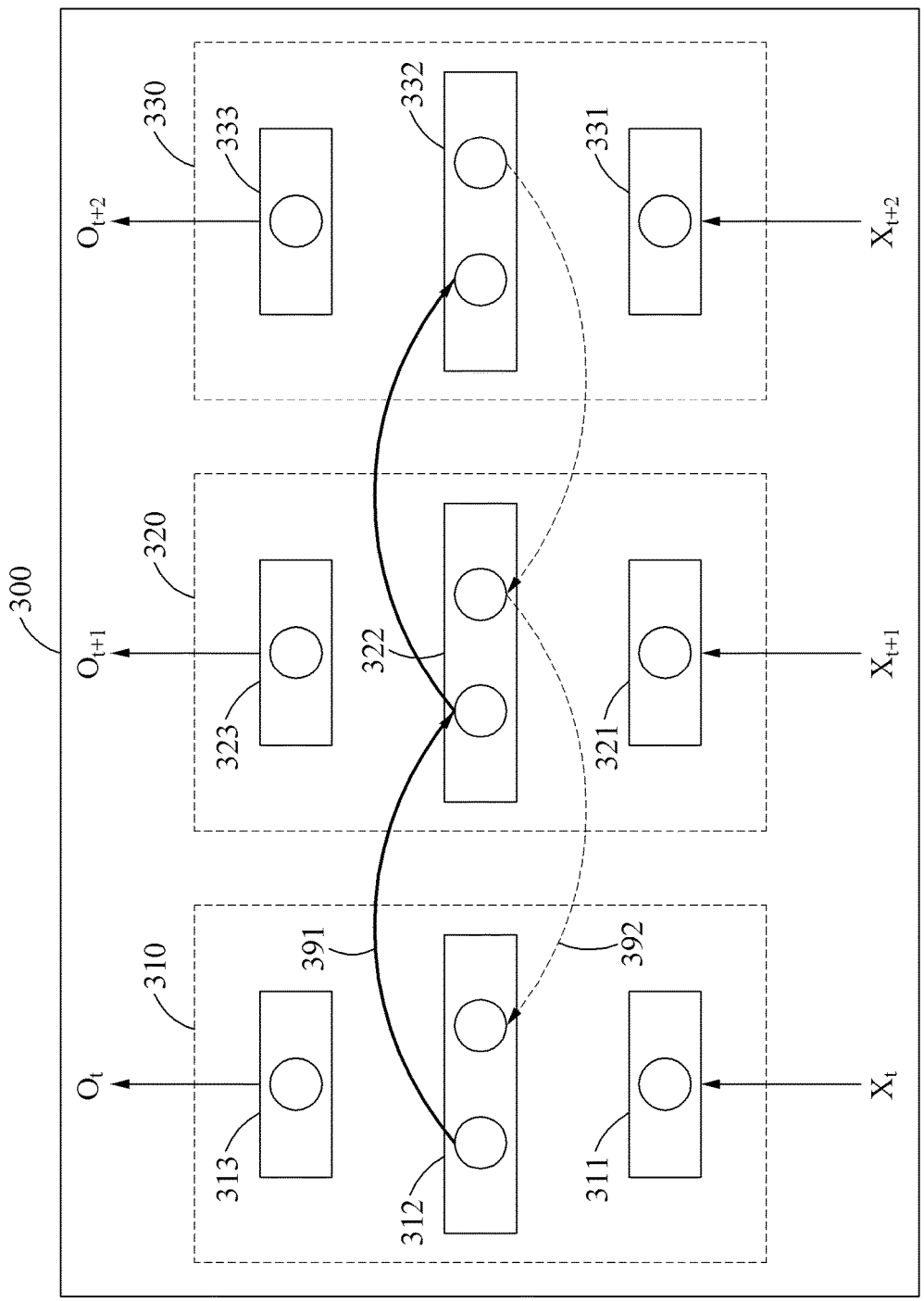
FIG. 3 illustrates an example of a bidirectional recurrent neural network.

FIG. 3 illustrates an example of a bidirectional recurrent neural network.

An RNN includes an input layer, a hidden layer, and an output layer. As discussed above, the hidden layer includes a plurality of nodes as hidden nodes. When the RNN is an LSTM neural network, each node includes a memory cell unit and the memory cell unit includes at least one time gate.

The input layer receives an input for performing training or recognition, and transfers the input to the hidden layer. The output layer generates an output of a neural network based on a signal received from the nodes of the hidden layer. The hidden layer is between the input layer and the output layer, and changes data to be recognized or training data transferred from the input layer to data that can be easily recognized by the output layer. Nodes in the input layer and the hidden layer are connected to one another by connection lines having respective connection weights. Also, nodes in the hidden layer and the output layer are connected to one another by connection lines having respective connection weights. The input layer, the hidden layer, and the output layer each may include a plurality of nodes.

Although FIG. 3 illustrates that an input layer and an output layer each includes a single node and a hidden layer include two nodes for brevity, a type of node and the number of nodes included in each of the layers may vary based on a design of the RNN.

A neural network may include a plurality of hidden layers. The neural network including a plurality of hidden layers is referred to as a deep neural network, and training of the deep neural network is referred to as deep learning. A node included in the hidden layer is referred to as a hidden node. A state parameter, for example, an output value of a hidden node in a previous time interval, is applied to hidden nodes of a current time interval, for example, a current frame. A state parameter of a hidden node in the current time interval is applied to hidden nodes of a subsequent time interval. A neural network having a recurrent connection between hidden nodes of different time intervals is also referred to as an RNN. In the example of FIG. 3, among the hidden nodes, a forward node is recurrently connected to another forward node, and a backward node is recurrently connected to another backward node.

FIG. 3 illustrates a case in which an RNN is unfolded by a window length corresponding to three frames. Although FIG. 3 illustrates that the RNN includes input layers 311, 321, and 331, hidden layers 312, 322, and 332, and output layers 313, 323, and 333 with respect to a first frame 310, a middle frame 320, and a last frame 330 of a window 300, respectively, this is merely an example. In other examples, the RNN may include a plurality of hidden layers for each frame of the window 300.

Each layer of the RNN receives a timestamp t corresponding to a current time. The current time may be, for example, free of an interlayer delay. The timestamp t may correspond to a phase signal. The phase signal may be applied to all layers updated at the same point in time. In the first frame 310 of the window 300, the input layer 311, the hidden layer 312, and the output layer 313 are layers updated at a time t. In the middle frame 320 of the window 300, the input layer 321, the hidden layer 322, and the output layer 323 are layers updated at a time t+1. In the last frame 330 of the window 300, the input layer 331, the hidden layer 332, and the output layer 333 are layers updated at a point in time t+2. Hereinafter, the point in time t+2 is also referred to as a time t+2.

Input data of the RNN may be sampled based on consecutive input signals. Hereinafter, the consecutive input signals are also referred to as sequence data. Input data of the RNN may be sampled uniformly and synchronously, and may also be sampled nonuniformly and asynchronously.

A hidden layer corresponding to each frame of the RNN forms a forward pass 391 with respect to a hidden layer of the same level in a subsequent frame. In the RNN, an i-th forward node of the hidden layer 312 corresponding to the first frame 310 in the window 300 forms the forward pass 391 with respect to an i-th forward node of the hidden layer 322 corresponding to a subsequent frame, for example, the middle frame 320 of FIG. 3, i being an integer greater than or equal to 1.

Also, the hidden layer of each frame of the RNN forms a backward pass 392 with respect to a hidden layer of the same level in a previous frame. In the RNN, a j-th backward node of the hidden layer 322 corresponding to the middle frame 320 of the window 300 forms the backward pass 392 with respect to a j-th backward node of the hidden layer 312 corresponding to a previous frame, for example, the first frame 312 of FIG. 3, j being an integer greater than or equal to 1. Nodes may be classified into forward nodes connected based on the forward pass 391 and backward nodes connected based on the backward pass 392.

In terms of the unfolded RNN, an RNN in which a forward pass and a backward pass are formed between hidden layers is referred to for example, as a bidirectional RNN.

Figure 4:
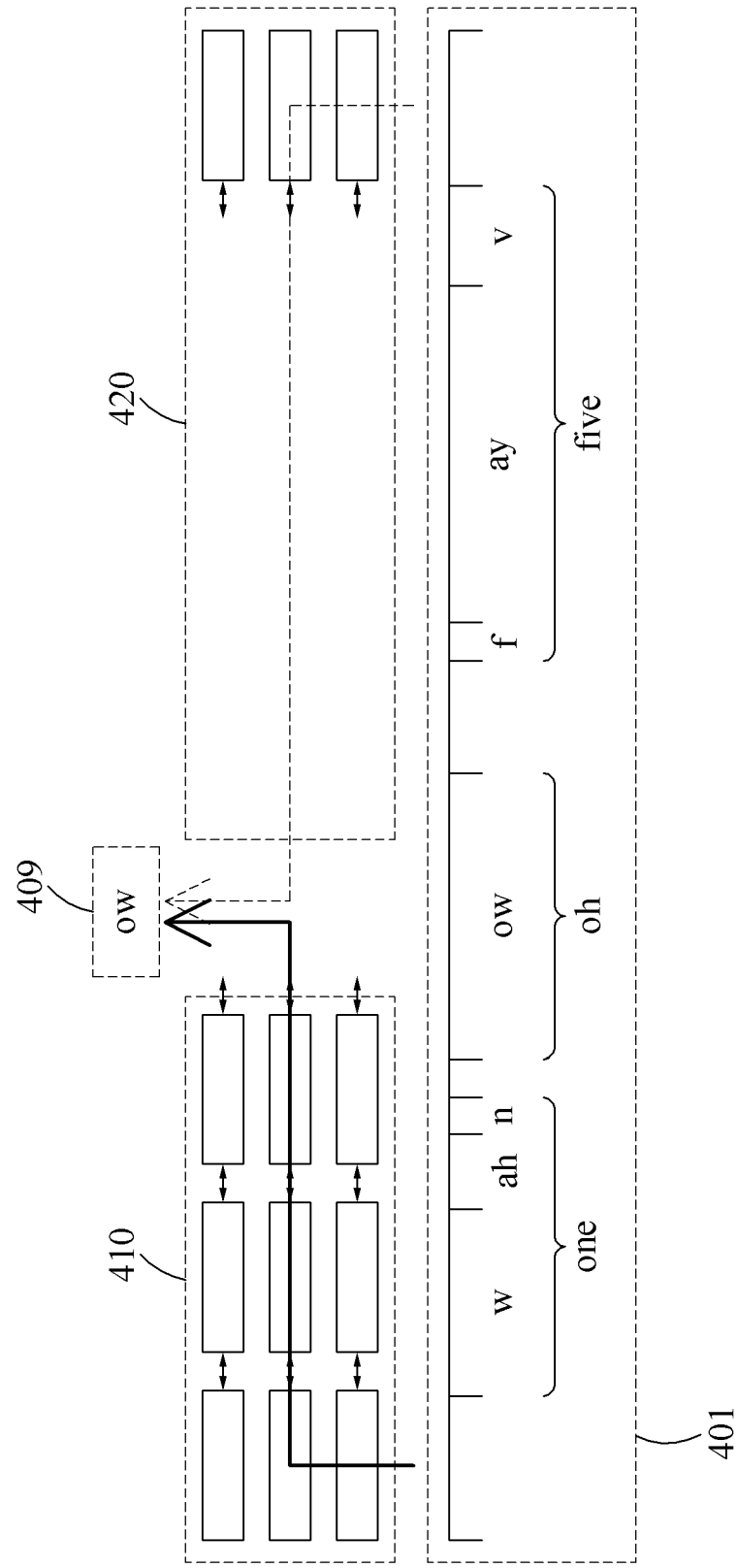
FIG. 4 illustrates an example of voice recognition based on a bidirectional recurrent neural network.

FIG. 4 illustrates an example of voice recognition based on a bidirectional recurrent neural network.

A recognition apparatus receives sequence data 401. The recognition apparatus receives a voice signal as the sequence data 401. In an example of FIG. 4, the recognition apparatus receives a voice signal "one oh five". The voice signal "one oh five" is also represented as "wahn ow fayv" using phonetic symbols.

The recognition apparatus references information based on previous frames 410 of a current frame and information based on subsequent frames 420 of the current frame to output a recognition result 409 of target data corresponding to a predetermined window from the sequence data 401. To recognize "oh", the recognition apparatus references information corresponding to "one" and "five" and outputs "ow" as the recognition result 409. The recognition result 409 may be pronunciation information, but is not limited thereto. The recognition apparatus estimates a word corresponding to a pronunciation based on the pronunciation information.

By using the bidirectional RNN, the recognition apparatus is allowed to use overall voice information. This enables the recognition apparatus to calculate a recognition result of target data corresponding to a current window with increased accuracy. Further, since the recognition apparatus recognizes sequence data in window units, the recognition result may be calculated at an increased speed. In this example, a training apparatus that trains a recurrent model used in the recognition apparatus may train a recurrent model having a high accuracy at the increased speed. Also, the recognition apparatus uses a state parameter of a previous window instead of adding a padding for a past context, thereby reducing a training error, a training time, a graphics processing unit (GPU) memory usage, a recognition error, and a recognition time, for example.

In this application, a recognition result may be a label to be output from target data corresponding to a current window. When sequence data is a voice signal, the target data may be a portion of a voice signal extracted to correspond to the current window, and the recognition result may be pronunciation information identified from the portion of voice signal. The pronunciation information includes, for example, a phoneme corresponding to each frame of the portion of the voice signal.

Figure 5:
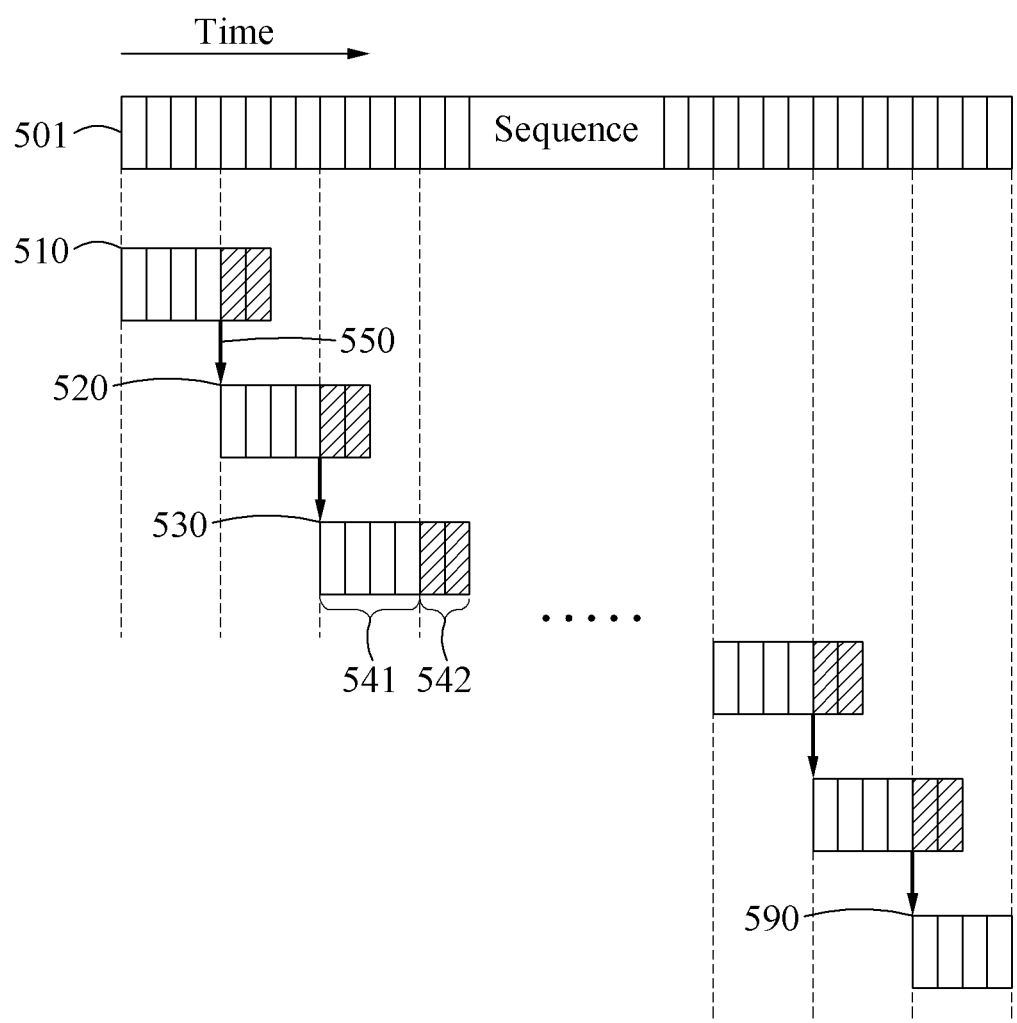
FIG. 5 illustrates an example of sequence data recognition using a recurrent neural network based on a state parameter and a padding.

FIG. 5 illustrates an example of a sequence data recognition using a recurrent neural network based on a state parameter and a padding.

To reference a past context without restriction on the length of the past context, a recognition apparatus calculates a recognition result of target data corresponding to a current window in consideration of a state parameter of a previous window. The recognition apparatus references padding data corresponding to a padding for a future context. Therefore, the recognition apparatus references the future context in addition to the past context, thereby improving accuracy and speed of recognition.

Referring to FIG. 5, sequence data 501 includes a plurality of frames. The recognition apparatus sequentially receives frame data constituting the sequence data 501. The frame data is, for example, data obtained by sampling the sequence data 501 based on a predetermined time interval.

The recognition apparatus segments the sequence data 501 in window units. The recognition apparatus processes target data corresponding to a first window 510, processes target data corresponding to a second window 520, and then processes target data corresponding to a third window 530. The recognition apparatus segments the sequence data 501 into target data corresponding to each window without overlapping frame data between windows. That is, any give frame data appears in only one window.

The recognition apparatus extracts, from the sequence data 501, target data 541 corresponding to the current window and padding data 542 corresponding to a padding connected subsequently to the current window. The recognition apparatus inputs the target data 541 and the padding data 542 to a recurrent model and calculates a recognition result of the target data 541.

The recognition apparatus stores a state parameter 550, for example, an output value of a hidden node, corresponding to a last frame of the current window in a process of calculating the recognition result of the target data 541. In this example, the recognition apparatus excludes a state parameter corresponding to the padding data of the padding connected subsequently to the current window.

To calculate a recognition result of a subsequent window, the recognition apparatus provides, as a feedforward, the stored state parameter 550 to a node, for example, a forward node, corresponding to a first frame of the subsequent window as illustrated in FIG. 5. This enables the recognition apparatus to reference the future context within a size of a padding while maintaining the past context. For the past context, a calculation complexity of the recognition apparatus is reduced since only the state parameter 550 stored in the previous window is input as an initial value of a node corresponding to a first frame of the current window. Also, the recognition apparatus references a past context using the state parameter 550 without restriction on the length of the past context, thereby improving an accuracy of recognition.

The recognition apparatus performs the recognition without using the padding data when the last frame data of a last window 590 is the last frame data of the sequence data 501.

Accordingly, the recognition apparatus may gradually decode, for example, a voice signal while guaranteeing an accuracy with a minimum overhead.

Although the description of FIG. 5 is provided based on an example of recognition, this is merely an example. Similarly to an operation of the recognition apparatus, a training apparatus may segment a training input of training data in window units and perform training using padding data.

The training apparatus stores a state parameter of a current window in a process of feedforward of target data and padding data of the training input to a recurrent model, and updates the recurrent model based on a back-propagation learning. When the training on the current window is completed, the training apparatus provides the state parameter of the current window and target data corresponding to a subsequent window in the training input to the recurrent model through the feedforward. The training and the backpropagation learning of the recurrent model will also be described with reference to FIG. 11.

Figure 6:
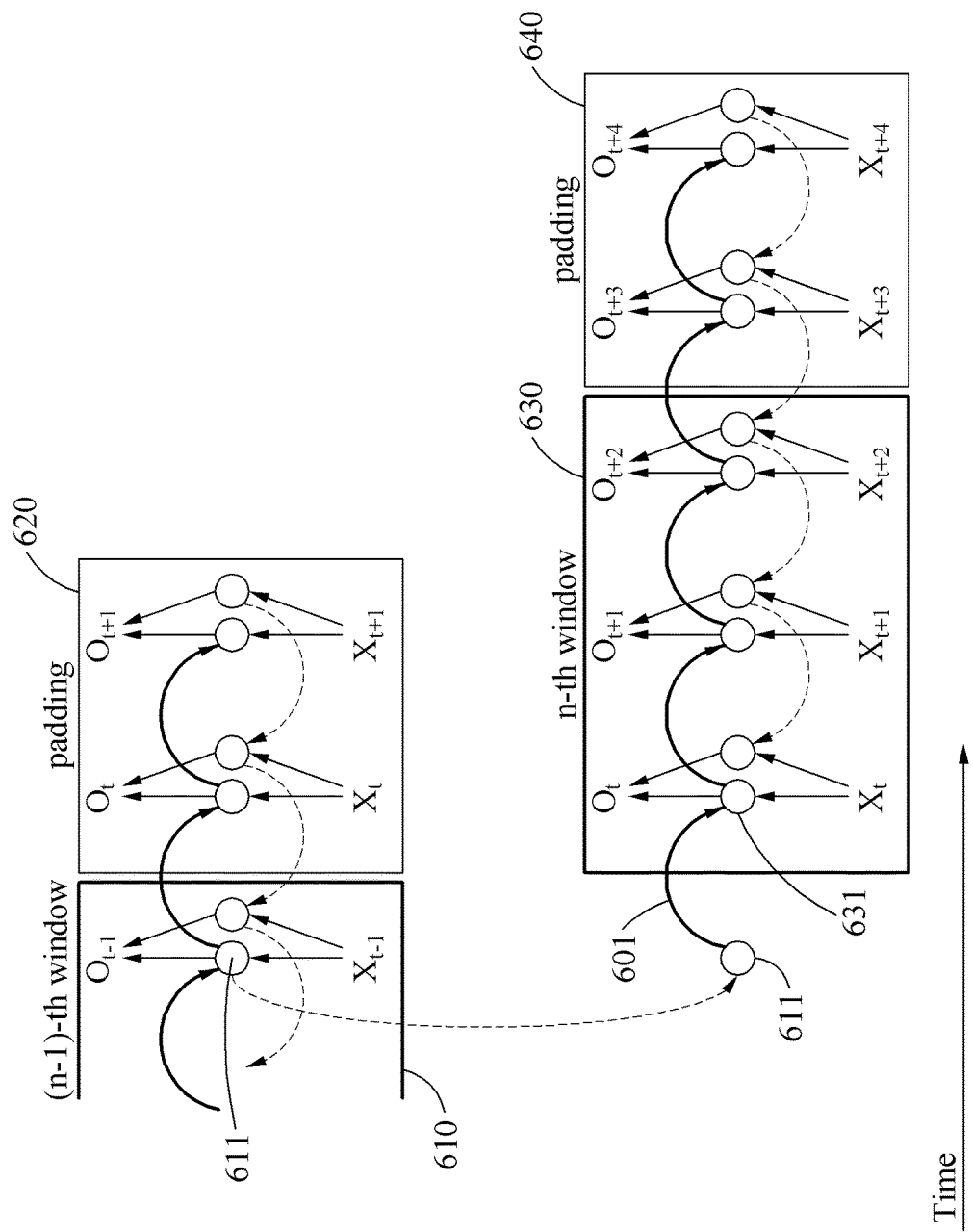
FIG. 6 illustrates an example of applying a state parameter of a previous window to a current window.

FIG. 6 illustrates an example of applying a state parameter of a previous window to a current window.

A recognition apparatus stores a state parameter of a node 611, for example, a forward node, corresponding to a last frame of an (n−1)-th window 610 in a process of calculating a recognition result of target data corresponding to the (n−1)-th window 610. The recognition apparatus excludes information associated with a padding 620 arranged subsequent to the (n−1)-th window 610, n being an integer greater than or equal to 2.

The recognition apparatus temporarily stores the state parameter corresponding to the node 611 in a separate storage. Thereafter, the recognition apparatus propagates the state parameter of the node 611 corresponding to the last frame of the (n−1)-th window 610 to a node 631, for example, a subsequent forward node, corresponding to a first frame of an n-th window 630 based on a forward pass 601.

The n-th window 630 corresponds to the current window. Hereinafter, the (n−1)-th window 610 is also referred to as the previous window 610 and the n-th window 630 is also referred to as the current window 630. The recognition apparatus determines an initial state parameter of the node 631 corresponding to the first frame of the current window 630 based on the state parameter of the last frame of the previous window 610.

The recognition apparatus updates a state parameter of each node of a recurrent model in the current window 630 based on the state parameter of the previous window 610, the target data corresponding to the current window 630, and padding data corresponding to a padding assigned to the current window 630.

Although the description of FIG. 6 is provided based on an example of the recognition apparatus, this is merely an example. Similarly to an operation of the recognition apparatus, a training apparatus references a state parameter corresponding to a last frame of a previous window and padding data to train a recurrent model on a training input corresponding to the current window.

Figure 7:
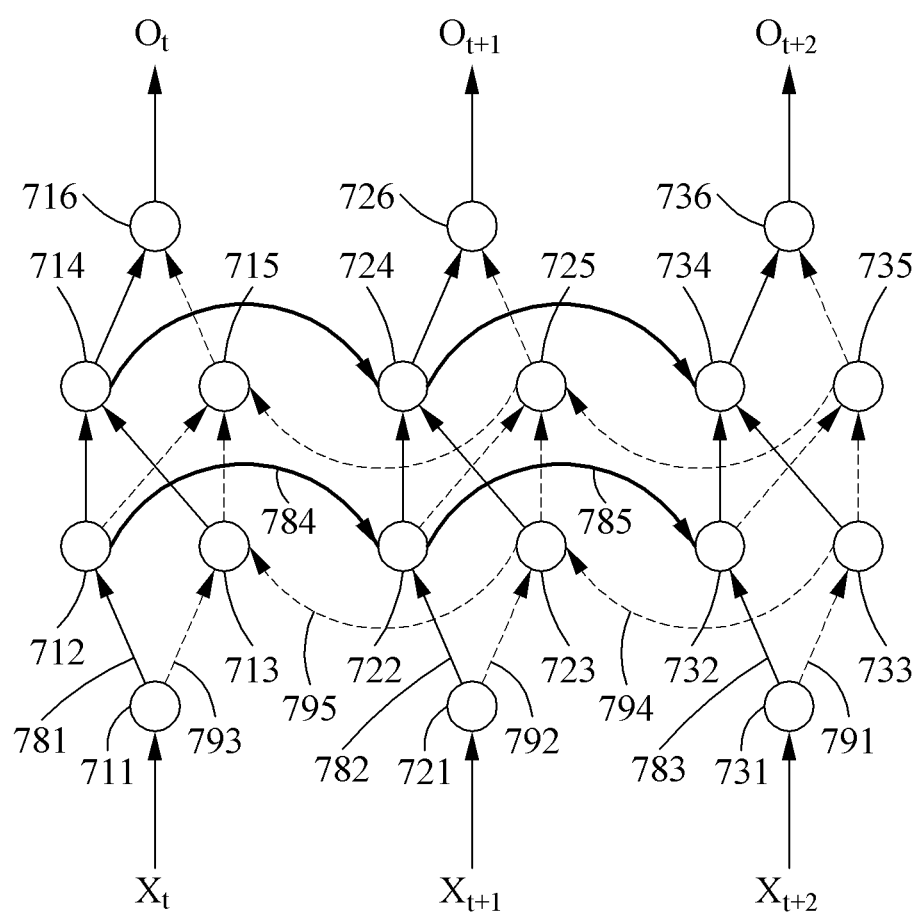
FIG. 7 illustrates an example of updating each node of a recurrent neural network.

FIG. 7 illustrates an example of updating each node of a recurrent neural network.

A recognition apparatus sequentially updates state parameters in layers of the same level, and then sequentially updates state parameters in layers of a subsequent level in an RNN.

In an example of FIG. 7, an RNN is set based on a window having three frames. Also, the RNN includes an input layer, two levels of hidden layers, and an output layer.

The recognition apparatus inputs frame data $x_t$, $x_{t+1}$, and $x_{t+2}$ included in target data corresponding to a window to input layers 711, 721, and 731 of the RNN at a time. The recognition apparatus transfers frame data of the target data input to the input layers 711, 721, and 731 to hidden layers through a feedforward. The recognition apparatus transfers the target data from the input layer 711 to a hidden layer 712 of a first frame through a feedforward 781, transfers the target data from the input layer 721 to a hidden layer 722 of a middle frame through a feedforward 782, and transfers the target data from the input layer 731 to a hidden layer 732 of a last frame through a feedforward 783.

The recognition apparatus sequentially updates nodes of a hidden layer based on a forward pass. The recognition apparatus transfers a state parameter of the hidden layer 712 of the first frame to the hidden layer 722 of the middle frame based on a forward pass 784, and updates a state parameter of the hidden layer 722. The recognition apparatus transfers the state parameter of the hidden layer 722 to the hidden layer 732 of the last frame based on a forward pass 785, and updates the state parameter of the hidden layer 732. The recognition apparatus repetitively performs an update of a state parameter based on a forward pass from the first frame to the last frame.

The recognition apparatus transfers the target data input to the input layers 711, 721, and 731 to hidden layers 713, 723, and 733 for a backward pass through feedforwards 793, 792, and 791. The recognition apparatus sequentially updates nodes of a hidden layer based on the backward pass. The recognition apparatus transfers a state parameter of the hidden layer 733 of the last frame to the hidden layer 723 of the middle frame based on a backward pass 794, and updates the state parameter of the hidden layer 723. The recognition apparatus transfers the state parameter of the hidden layer 723 to the hidden layer 713 of the first frame based on a backward pass 795, and updates the state parameter of the hidden layer 713. The recognition apparatus repetitively performs an update of a state parameter based on a backward pass from the last frame to the first frame.

Likewise, the recognition apparatus updates state parameters of hidden layers 714, 715, 724, 725, 734, and 735 of a subsequent level and outputs recognition results to output layers 716, 726, and 736.

Figure 8:
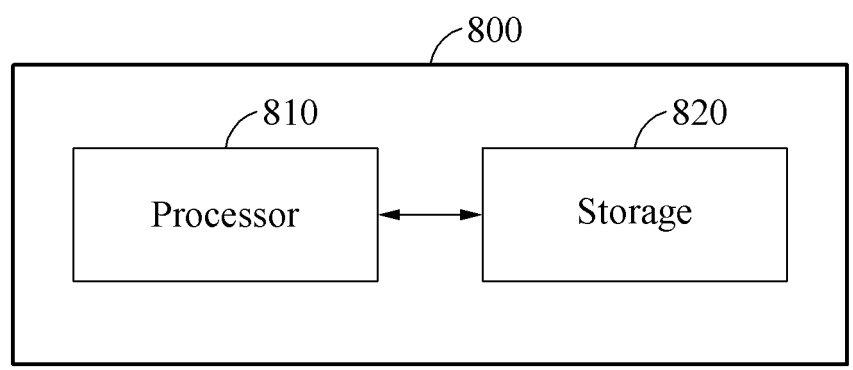
FIG. 8 illustrates an example of a recognition apparatus.

FIG. 8 illustrates an example of a recognition apparatus.

A recognition apparatus 800 includes a processor 810 and a storage 820.

The processor 810 extracts target data corresponding to a current window and padding data subsequent to the target data from sequence data. The processor 810 acquires a state parameter corresponding to a previous window from the storage 820. The processor 810 calculates a recognition result of the current window using the state parameter, the extracted target data, and the extracted padding data based on a recurrent model.

An operation of the processor 810 is not limited to the aforementioned example, and the processor 810 may also perform the operations described with reference to FIGS. 1 through 7, 10, and 12.

The storage 820 includes the recurrent model. The recurrent model is a model trained so that a training output is output from a training input and includes, for example, an RNN. As in the foregoing, the recurrent model includes a node corresponding to each frame in a window and a padding. The node is included in, for example, a hidden layer of the recurrent model. Also, the storage 820 stores a state parameter of each node in the recurrent model.

Figure 9:
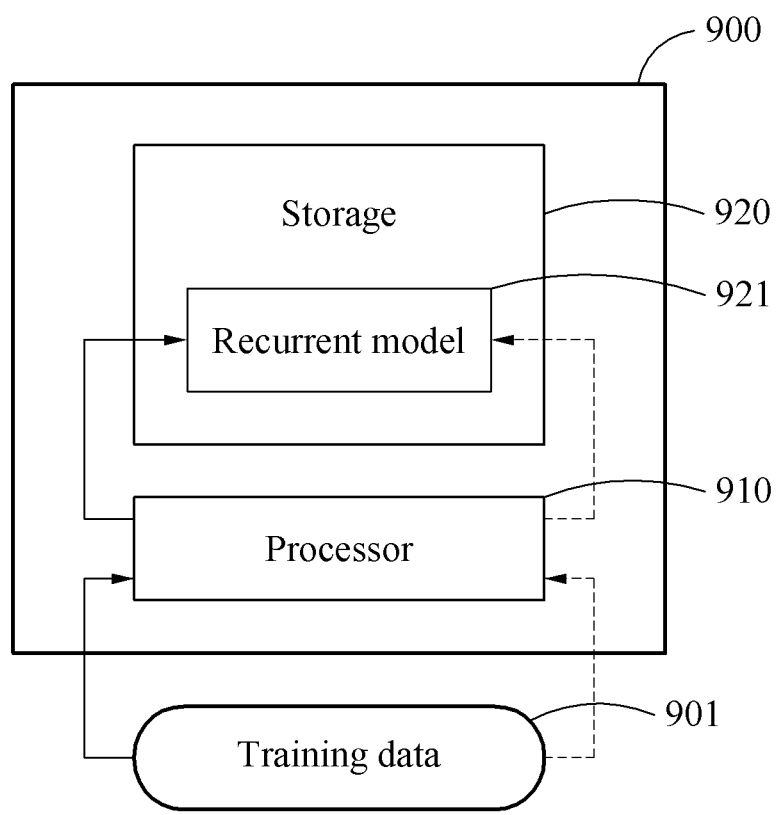
FIG. 9 illustrates an example of a training apparatus.

FIG. 9 illustrates an example of a training apparatus.

A training apparatus 900 includes a processor 910 and a storage 920.

The processor 910 acquires a recurrent model 921. The processor 910 extracts target data corresponding to a current window and padding data subsequent to the target data from a training input. The processor 910 acquires a state parameter corresponding to a previous window from the storage 920. The processor 910 trains the recurrent model 921 so that a training output mapped to the training input is calculated from the state parameter, the extracted target data, and the extracted padding data. An operation of the processor 910 is not limited to the aforementioned example, and the processor 910 may also perform the operations described with reference to FIGS. 1 through 7, 11, and 12.

Training data 901 includes a training input and a training output. The training output is an output mapped to the training input. The training output is, for example, a label to be output from the training input. In terms of voice recognition, for example, the training input is a voice signal and the training output is phoneme information indicated by the voice signal.

The processor 910 performs training of a state parameter of a node and a connection weight between layers of the recurrent model 921 based on an error back-propagation learning.

The processor 910 trains a neural network, for example, an RNN, based on a supervised learning. The supervised learning is, for example, a method of inputting a training input and a training output corresponding to the training input to a neural network and updating connection weights of connection lines of the neural network so that the training output corresponding to the training input is output. The processor 910 employs, for example, a delta rule and the error back-propagation learning to update a connection weight between nodes.

The error back-propagation learning is, for example, a method that estimates an error by performing forward computation on training data, propagates the estimated error in a reverse direction from an output layer through a hidden layer to an input layer, and adjusts connection weights to reduce the error. A recognition processing of the neural network is performed in an order from the input layer, the hidden layer, and the output layer. In the error back-propagation learning, the connection weights are updated in an order from the output layer, the hidden layer, and the input layer.

The storage 920 stores the recurrent model 921. The storage 920 stores the recurrent model 921 sequentially updated in a process of training. The storage 920 may also the training data 901.

Figure 10:
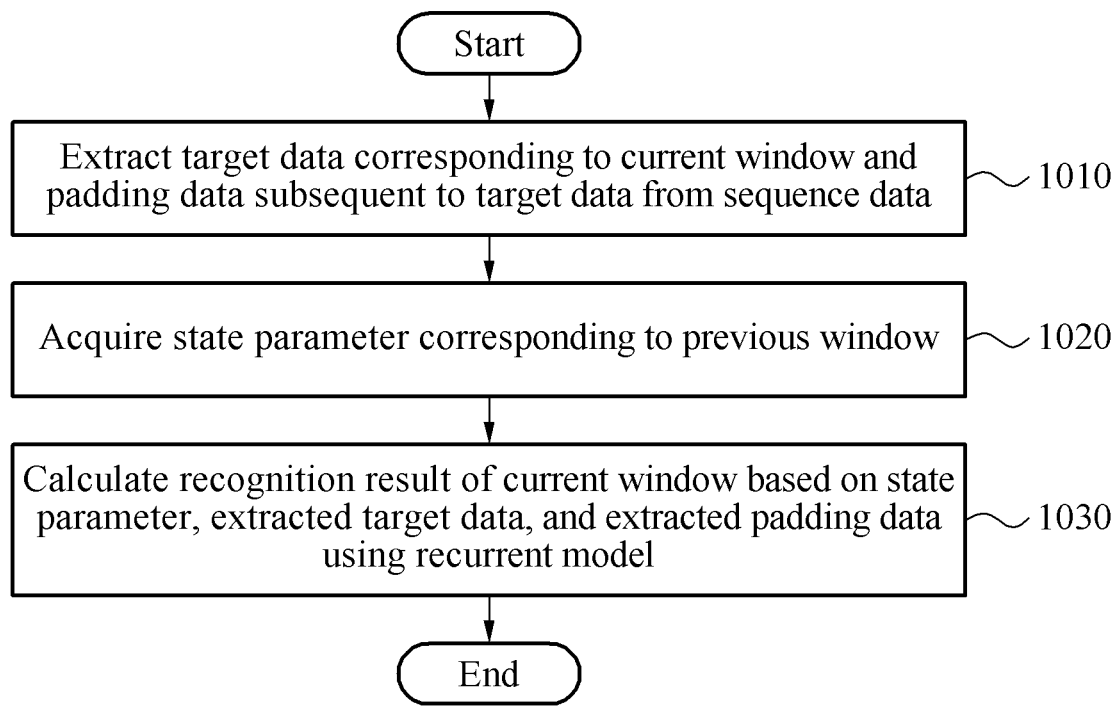
FIG. 10 illustrates an example of a recognition method.

FIG. 10 illustrates an example of a recognition method.

Hereinafter, a recognition process for a single window of sequence data will be described with reference to operations 1010 through 1030. A recognition apparatus segments the sequence data in window units and repetitively performs operations 1010 through 1030 on a first window through a last window, thereby obtaining a recognition result.

In operation 1010, the recognition apparatus extracts, from sequence data, target data corresponding to a current window and padding data subsequent to the target data. The recognition apparatus extracts data corresponding to a window length, starting from frame data subsequent to last frame data of a previous window, from the sequence data as the target data corresponding to the current window. Also, the recognition apparatus extracts data corresponding to a padding length, starting from frame data subsequent to last frame data of the current window, from the sequence data as the padding data corresponding to a padding. The recognition apparatus receives, for example, sequence data corresponding to a voice signal.

When the current window is the last window of the sequence data, the recognition apparatus excludes the padding data. As described with reference to FIG. 5, when the current window is the last window, sequence data to be acquired as the padding is absent in the sequence data. Thus, the recognition apparatus excludes the padding with respect to the last window.

In operation 1020, the recognition apparatus acquires a state parameter corresponding to the previous window.

When the current window is the first window of the sequence data, the recognition apparatus determines a state parameter corresponding to the previous window to be a default value, for example, 0. This enables the recognition apparatus to input target data corresponding to the first window excluding an influence of the previous window in a recurrent model.

In operation 1030, the recognition apparatus calculates a recognition result of the current window using the state parameter, the extracted target data, and the extracted padding data based on a recurrent model. The recognition apparatus identifies a pronunciation from the target data corresponding to the current window. The recognition apparatus unfolds the recurrent model by the window length and the padding length of the current window. The recognition apparatus inputs the state parameter, the extracted target data, and the extracted padding data for each frame of the unfolded recurrent model, and calculates output data corresponding to frames included in the current window.

The recognition apparatus updates an input value of a node corresponding to a first frame of the current window based on a state parameter corresponding to the last frame of the previous window. As described with reference to FIG. 6, the recognition apparatus temporarily stores the state parameter of the last frame in the previous window and uses the stored state parameter to update a value to be input to the current window.

The recognition apparatus updates a state parameter based on a forward pass sequentially from a first frame to a last frame of a window. The recognition apparatus updates a state parameter based on a backward pass sequentially from a last frame to a first frame of a window. The recognition apparatus provides the state parameter based on the forward pass and the state parameter based on the backward pass to a node of a subsequent layer. Updates of the state parameter based on the forward pass and the state parameter based on the backward pass may be as described with reference to FIG. 7.

The recognition apparatus temporarily stores the state parameter corresponding to the last frame in the current window for use in a subsequent window.

The recognition apparatus excludes a state parameter associated with a padding and output data associated with the padding data calculated based on the recurrent model. For example, the recognition apparatus ignores a recognition result related to the padding data and excludes the state parameter associated with the padding from information to be used for recognition of the subsequent window.

The recognition apparatus may apply the recurrent model to, for example, voice recognition, writing recognition, translation, text creation, and natural language understanding (NLU).

Figure 11:
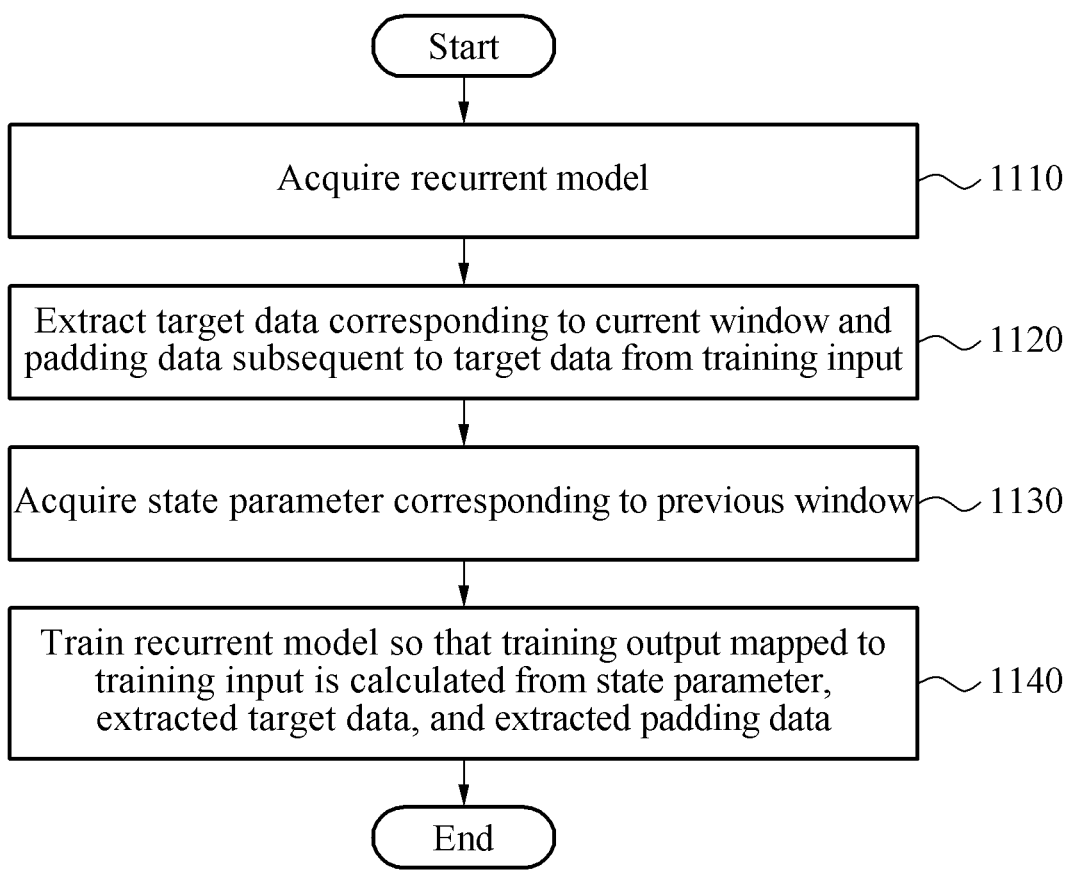
FIG. 11 illustrates an example of a training method.

FIG. 11 illustrates an example of a training method.

Hereinafter, a training process for a single window of sequence data will be described with reference to operations 1110 through 1140. A training apparatus segments the sequence data in window units and repetitively performs operations 1110 through 1140 on a first window through a last window, thereby performing training sequentially.

In operation 1110, the training apparatus acquires a recurrent model. The training apparatus loads the recurrent model from an internal storage or receives the recurrent model from an external server.

In operation 1120, the training apparatus extracts, from a training input, target data corresponding to a current window and padding data subsequent to the target data. The training apparatus excludes the padding data when the current window is a last window of a training input.

In operation 1130, the training apparatus acquires a state parameter corresponding to a previous window. When the current window is a first window of the training input, the training apparatus determines the state parameter corresponding to the previous window to be a default value, for example, 0. Thus, when the current window is the first window of the training data, the training apparatus ignores the previous window because there is no previous window.

In operation 1140, the training apparatus trains the recurrent model so that a training output mapped to the training input is calculated from the state parameter, the extracted target data, and the extracted padding data. The training apparatus updates a state parameter of a node corresponding to a first frame of the current window based on a state parameter corresponding to a last frame of the previous window.

The training apparatus excludes output data associated with a padding calculated based on a state parameter associated with the padding using the recurrent model. When the training of the current window is completed, the training apparatus uses an output value of a hidden node in a hidden layer of the last frame in the current window for training of a subsequent window. Also, the training apparatus excludes the state parameter and the output data associated with the padding from the training of the subsequent window.

Figure 12:
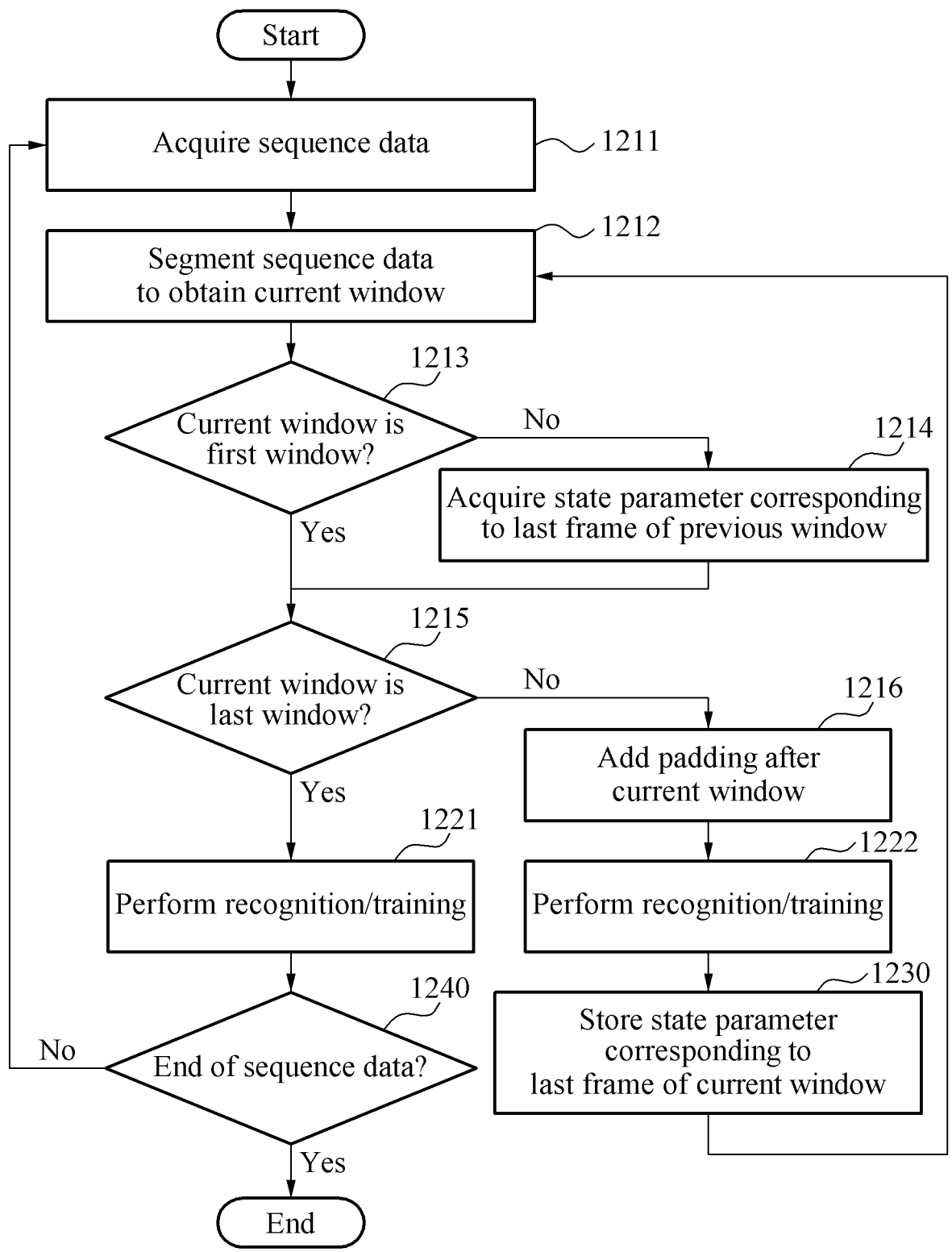
FIG. 12 illustrates an example of setting a window and a padding for sequence data in a recognition method and a training method.

FIG. 12 illustrates an example of setting a window and a padding for sequence data in a recognition method and a training method.

A processor of a recognition apparatus or a training apparatus segments sequence data in window units and performs recognition or training in operations 1211 through 1240.

In operation 1211, the processor acquires sequence data. The processor acquires the sequence data through, for example, communication with an external device or an internal data interface. The processor receives frame data constituting the sequence data sequentially over time.

In operation 1212, the processor segments the sequence data to obtain a current window. The processor segments a series of consecutive items of frame data based on a window length to obtain the current window as target data for the recognition or training. The processor segments the sequence data without overlapping frame data between windows. That is, any given item of frame data appears in only one window.

In operation 1213, the processor determines whether the current window is a first window. The processor determines that the current window is the first window when frame data previous to the current window is absent in the sequence data.

In operation 1214, the processor acquires a state parameter corresponding to a last frame of the previous window when the current window is not the first window. When the current window is not a first window of the sequence data, the processor calculates a state parameter corresponding to a last frame of the previous window and stores the state parameter in a process of performing recognition or training on the previous window. The processor loads the stored state parameter.

In operation 1215, the processor determines whether the current window is a last window. When frame data subsequent to the current window is absent in the sequence data, the processor determines that the current window is the last window.

In operation 1216, the processor adds a padding after the current window when the current window is not the last window. The processor additionally extracts frame data corresponding to a padding, for example, padding data, from the sequence data. As such, the processor extracts data corresponding to a window and padding data corresponding to a padding.

In operation 1222, the processor performs recognition or training. When the processor is, for example, a device implemented inside the recognition apparatus, the processor generates a recognition result corresponding to the target data based on the target data and the padding data extracted in operation 1216. Also, when the processor is, for example, a device implemented inside the training apparatus, the processor trains the recurrent model based on the target data and the padding data extracted in operation 1216 so that a label mapped to the target data is output.

In operation 1230, the processor stores the state parameter corresponding to the last frame of the current window. The stored state parameter corresponding to the last frame of the current window is used to update a state parameter of a node corresponding to a first frame of the subsequent window.

In operation 1221, the processor performs recognition or training when the current window is the last window. When the processor is, for example, a device implemented inside the recognition apparatus, the processor generates a recognition result corresponding to the target data based on the target data corresponding to the current window segmented in operation 1212. Also, when the processor is, for example, a device implemented inside the training apparatus, the processor trains the recurrent model based on the target data corresponding to the current window segmented in operation 1212 so that a label mapped to the target data is output.

In operation 1240, the processor determines whether the sequence data ends. When the sequence data ends, the processor terminates an operation of the recognition or the training. When sequence data corresponding to a window subsequent to the current window is present, the processor returns to operation 1211.

The recurrent neural network (RNN) 100 and the node 110 in FIG. 1, the forward nodes 211, 221, and 231 and the backward nodes 212, 222, and 232 in FIG. 2, the input layers 311, 321, and 331, the hidden layers 312, 322, and 332, and the output layers 313, 323, and 333 in FIG. 3, the nodes 610 and 611 and the other unlabeled nodes in FIG. 6, the input layers 711, 721, and 731, the hidden layers 712, 713, 714, 715, 722, 723, 724, 725, 732, 733, 734, and 735, and the output layers 716, 726, and 736 in FIG. 7, the recognition apparatus 800, the processor 810, and the storage 820 in FIG. 8 and the training apparatus 900, the processor 910, and the storage 920 in FIG. 9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 10-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A recognition method comprising:
   extracting target data corresponding to a current window and padding data subsequent to the target data from sequence data;
   acquiring a state parameter of a recurrent model corresponding to target data of a previous window of the sequence data; and
   calculating a recognition result for the current window based on the state parameter, the extracted target data, and the extracted padding data using the recurrent model,
   wherein a state parameter, of a padding data provided node in the recurrent model corresponding to the target data of the previous window, is not considered in the calculating of the recognition result for the current window.

2. The recognition method of claim 1, further comprising temporarily storing a state parameter corresponding to a last frame of the current window for use in a subsequent window.

3. The recognition method of claim 1, wherein the calculating of the recognition result comprises:
   unfolding the recurrent model by a window length and a padding length of the current window; and
   inputting the state parameter, the extracted target data, and the extracted padding data to the unfolded recurrent model for each frame and calculating output data corresponding to frames included in the current window.

4. The recognition method of claim 1, wherein the calculating of the recognition result comprises updating an input value of a node corresponding to a first frame of the current window based on a state parameter corresponding to a last frame of the previous window.

5. The recognition method of claim 1, wherein the extracting of the target data and the padding data comprises extracting data corresponding to a window length, starting from frame data subsequent to last frame data of the previous window, from the sequence data as the target data corresponding to the current window.

6. The recognition method of claim 1, wherein the extracting of the target data and the padding data comprises extracting data corresponding to a padding length, starting from frame data subsequent to last frame data of the current window, from the sequence data as the padding data corresponding to a padding.

7. The recognition method of claim 1, wherein the recurrent model is a bidirectional recurrent neural network that is trained to output a training output in response to a training input based on training data.

8. The recognition method of claim 1, wherein the recurrent model comprises a node corresponding to each frame included in a window and a padding; and
   the calculating of the recognition result comprises:
      updating a state parameter based on a forward pass of the node sequentially from a first frame to a last frame of the window;
      updating a state parameter based on a backward pass of the node sequentially from the last frame to the first frame of the window; and
      providing the state parameter based on the forward pass and the state parameter based on the backward pass to a node of a subsequent layer.

9. The recognition method of claim 1, wherein the sequence data corresponds to a voice signal; and
   the calculating of the recognition result comprises identifying a pronunciation from the target data corresponding to the current window.

10. The recognition method of claim 1, wherein the acquiring of the state parameter corresponding to the previous window comprises determining the state parameter corresponding to the previous window to be a default value in response to the current window being a first window with respect to the sequence data.

11. The recognition method of claim 1, wherein the extracting of the target data and the padding data comprises excluding the padding data in response to the current window being a last window with respect to the sequence data.

12. A non-transitory computer-readable medium storing instructions that, when executed by a processor, cause the processor to perform the recognition method of claim 1.

13. A recognition apparatus comprising:
a storage configured to store a recurrent model; and
a processor configured to:
extract target data corresponding to a current window and padding data subsequent to the target data from sequence data,
acquire a state parameter of the recurrent model corresponding to target data of a previous window of the sequence data, and
calculate a recognition result for the current window based on the state parameter, the extracted target data, and the extracted padding data using the recurrent model,
wherein a state parameter, of a padding data provided node in the recurrent model corresponding to the target data of the previous window, is not considered in the calculating of the recognition result for the current window.

14. A training method comprising:
acquiring a recurrent model;
extracting target data corresponding to a current window and padding data subsequent to the target data from a training input;
acquiring a state parameter of the recurrent model corresponding to target data of a previous window of the training input; and
training the recurrent model so that a training output mapped to the training input is calculated based on the state parameter, the extracted target data, and the extracted padding data,
wherein a state parameter, of a padding data provided node in the recurrent model corresponding to the target data of the previous window, is not considered in the calculating of the training output for the current window.

15. The training method of claim 14, further comprises temporarily storing a state parameter corresponding to a last frame of the current window for use in a training based on training data of a subsequent window in response to data corresponding to the subsequent window being present in the training input.

16. The training method of claim 14, further comprising excluding output data associated with a padding calculated based on a state parameter associated with the padding using the recurrent model.

17. The training method of claim 14, wherein the training comprises updating a state parameter of a node corresponding to a first frame of the current window based on a state parameter corresponding to a last frame of the previous window.

18. The training method of claim 14, wherein the acquiring of the state parameter corresponding to the previous window comprises determining the state parameter corresponding to the previous window to be a default value in response to the current window being a first window with respect to the training input.

19. The training method of claim 14, wherein the extracting of the target data and the padding data comprises excluding the padding data in response to the current window being a last window with respect to the training input.

20. A recognition method comprising:
extracting target data corresponding to a current window from sequence data;
acquiring past context data, of a recurrent model, corresponding to target data of a previous window preceding the current window in the sequence data;
acquiring future context data corresponding to data following the current window in the sequence data, the past context data and the future context data being different types of data; and
calculating a recognition result for the current window based on the past context data, the extracted target data, and the future context data using the recurrent model,
wherein a state parameter, of a padding data provided node in the recurrent model corresponding to the target data of the previous window, is not considered in the calculating of the recognition result for the current window.

21. The recognition method of claim 20, wherein the acquiring of the past context data comprises acquiring, as the past context data, a state parameter corresponding to a previous window preceding the current window in the sequence data; and
the acquiring of the future context data comprises extracting, as the future context data, padding data following the extracted target data from the sequence data.

22. The recognition method of claim 21, wherein the acquiring of the state parameter comprises:
setting the state parameter to a default value in response to the current window being a first window of the sequence data; and
acquiring, as the state parameter, a state parameter obtained during recognition performed on the previous window in response to the current window not being the first window of the sequence data.

23. The recognition method of claim 22, wherein the state parameter obtained during the recognition performed on the previous window is stored during the recognition performed on the previous window; and
the acquiring of the state parameter obtained during the recognition performed on the previous window comprises retrieving the stored state parameter.

24. The recognition method of claim 21, wherein the previous window and the current window each comprise a plurality of frames; and
the acquiring of the state parameter comprises acquiring a state parameter corresponding to a final frame of the previous window.

25. A training method comprising:
acquiring a recurrent model;
extracting target data corresponding to a current window from a training input, including segmenting the training input without overlapping frame data between windows;
acquiring past context data, of the recurrent model, corresponding to target data of a previous window preceding the current window in the training input;
acquiring future context data corresponding to data following the current window in the training input, the past context data and the future context data being different types of data; and
training the recurrent model so that a training output mapped to the training input is calculated based on the past context data, the extracted target data, and the future context data,
wherein a state parameter, of a padding data provided node in the recurrent model corresponding to the target data of the previous window, is not considered in the calculating of the recognition result for the current window.

26. The training method of claim 25, wherein the acquiring of the past context data comprises acquiring, as the past context data, a state parameter corresponding to a previous window preceding the current window in the training input; and the acquiring of the future context data comprises extracting, as the future context data, padding data following the extracted target data from the training input.

27. The training method of claim 26, wherein the acquiring of the state parameter comprises:

setting the state parameter to a default value in response to the current window being a first window of the training input; and acquiring, as the state parameter, a state parameter obtained during training performed on the previous window in response to the current window not being the first window of the training input.

28. The training method of claim 27, wherein the state parameter obtained during the training performed on the previous window is stored during the training performed on the previous window; and the acquiring of the state parameter obtained during the training performed on the previous window comprises retrieving the stored state parameter.

29. The training method of claim 26, wherein the previous window and the current window each comprise a plurality of frames; and the acquiring of the state parameter comprises acquiring a state parameter corresponding to a final frame of the previous window.

* * * * *